Patented Oct. 28, 1947

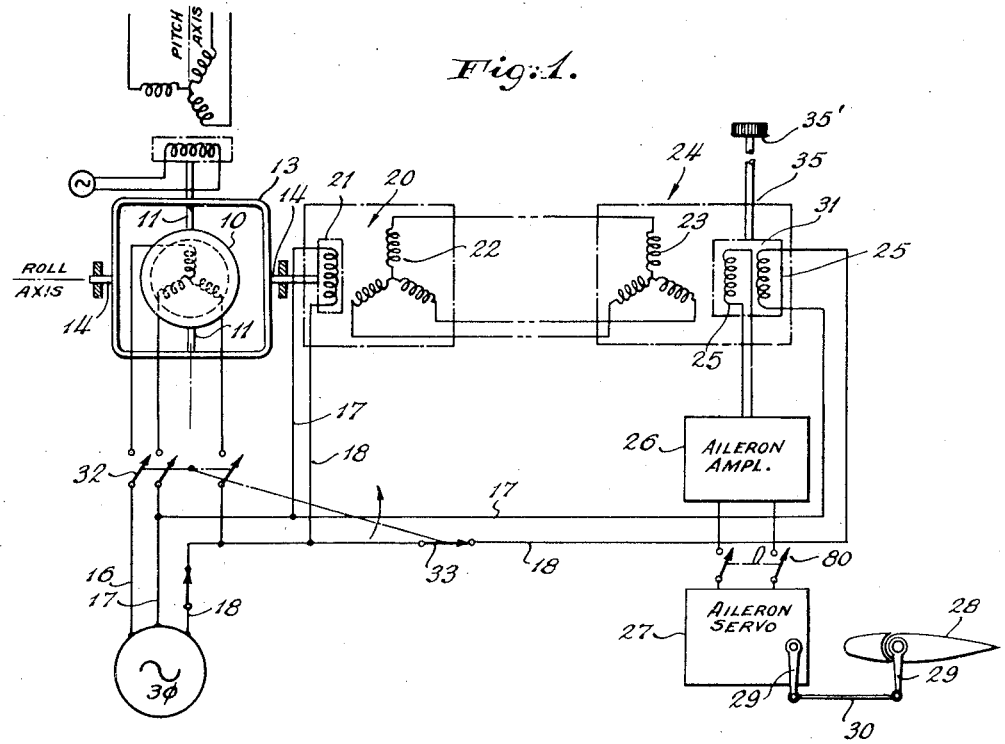
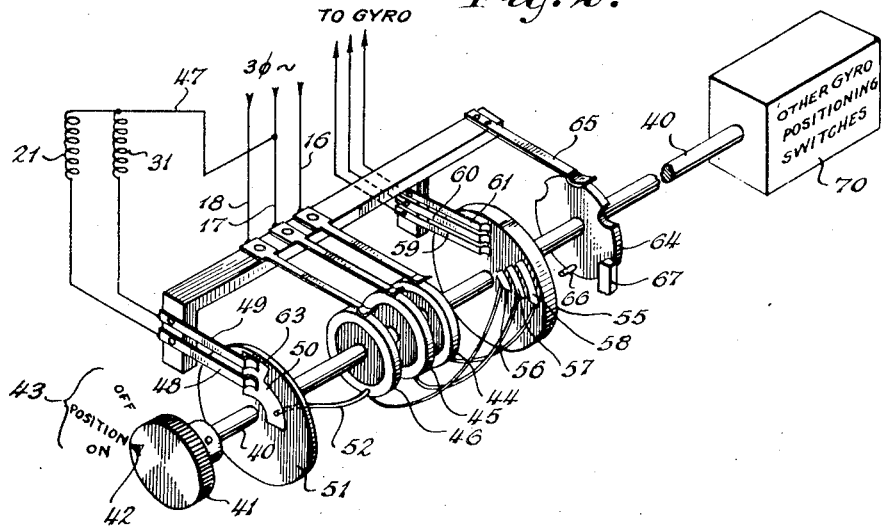

2,429,605

UNITED STATES PATENT OFFICE 2,429,605

PRESETTING MEANS FOR LONG PERIOD GYROSCOPES

Richard S. Brannin, East Williston, N. Y., assignor to Sperry Gyroscope Company, Inc., a corporation of New York Application April 17, 1944, Serial No. 531,509

8 Claims. (Cl. 172—282)

This invention relates to novel means for presetting gyroscopes into their true or normal running positions on a craft prior to or simultaneously with the starting of the rotor, and especially relates to electrical means for accomplishing such presetting from any convenient point on the craft, which may be remote from the gyroscope.

My invention may obviously be applied to the several types of three-degree of freedom gyroscopes normally used on aircraft, such as the gyroscopic artificial horizon or gyro-vertical, directional gyroscope and slaved or gyro-magnetic compasses. In the former case, the normal or true position of the gyroscope is usually vertical or at a predetermined angle to the vertical, while in the latter case the normal or true position in azimuth usually bears a fixed relation to the meridian, while in elevation the spin axis is usually maintained horizontal. While my invention may be applied to gyroscopic reference indicators in general, it has particular application to gyroscopes used as references in automatic pilots.

When an automatic pilot is turned off, the gyroscopes may assume positions far from normal as they slow down. When the pilot is turned on again, the usual torque applying devices become effective to restore the gyroscopes to their true positions. The correction rate of precession of such devices is purposely made low, say four degrees a minute, so that during use disturbances will have little effect on the gyroscope's position. Depending on displacement, it may take many minutes after the pilot has been turned on before the gyroscopes reach their true positions and the automatic pilot is ready for service. This delay has been something of a handicap in the case of war planes which must take off with short notice.

A feature of the invention is the provision of a simple circuit arrangement for presetting one or more of the airplane's gyroscopes while the plane is on the ground into true position from points remote from the gyroscopes.

Another feature is the provision of a simplified arrangement for setting gyroscopes of a gyro pilot automatically in approximately true position which can be installed on existing gyro pilots with a minimum of alteration.

Other objects will appear in the following description given with the aid of the accompanying drawings, of which Fig. 1 is a schematic drawing of a gyroscope circuit according to one embodiment of the invention; and Fig. 2 is a schematic drawing of a switch.

Referring to Fig. 1, this figure shows the invention in connection with a vertical gyroscope of an automatic pilot, the details of the pilot not pertinent to the present invention being omitted. A gyroscope 10 is shown as being supported along its roll axis by shafts 11 pivoted in gimbal frame 13, held by pivoted shafts 14 disposed along the roll axis. The windings of the gyroscope are energized over conductors 16, 17 and 18 from a source of three-phase potential.

The spin axis of the gyroscope will be understood to be maintained in vertical position in space, or at some desired position with respect to vertical, by suitable erection means, not shown.

Selsyn motor systems are used in gyro pilots to signal any motion of the plane about the axes of the respective gyroscopes to suitable amplifiers which control the guiding of the plane. As is well known, a gyro pilot may be set for any desired course and will operate the steering mechanism to correct the course of the plane whenever it senses a deviation from the set course. In the drawing, the selsyn circuit is shown as being associated only with the roll axis of a vertical gyroscope. It will be understood that similar arrangements may be provided for the pitch axis and also the axes of a directional gyroscope of either the free or gyro magnetic (Gyrosyn) type, not shown. The invention, however, as applied to gyro magnetic or Gyrosyn Systems is made the subject of a separate later application of applicant's, joint with Messrs. Braddon and de Westfeldt, Serial No. 585,984, filed March 31, 1945, for Presetting means for gyro magnetic compasses. (See Fig. 3 thereof.)

A selsyn motor 20 provided with a single phase rotor 21 fixed to shaft 14 of the gimbal ring and having a three-phase stator 22, has the phase windings of the latter connected to corresponding phase windings of a stator 23 of a selsyn motor 24. The rotor of motor 24 is provided with two windings displaced from each other. One winding 25 is a signal pick-up winding and is connected to the input of an amplifier 26, shown as an aileron amplifier in the drawings. The aileron amplifier has its output connected to aileron servo 27 shown diagrammatically as controlling aileron 28 by means of cranks 29 and connecting rod 30. It will be understood that while the airplane is following the course set into the gyro pilot, winding 25 will be at the electric null with respect to the three-phase windings 23. If the plane rolls, constantly energized rotor 21 will turn with respect to stator 22 and currents will be induced thereby in windings 22 and 23 of a magnitude and phase direction responsive to the roll of the plane. Pick-up winding 25 will be energized, operating amplifier 26, and servo 27 will displace aileron 28 until the plane is back on its course at which time no signal appears across the pick-up coil.

The second winding 31 is disconnected during normal operation of the pilot and is used only for erecting the gyroscope.

A means for positioning the rotor of motor 24 is indicated schematically by shaft 35. In practice, the shaft will be positioned by a member, such as knob 35', associated with the gyro pilot by which the attitude of the plane is set. The knob is set in starting to the zero or level flight position, and therefore the gimbal 13 of the gyroscope will be leveled if the airplane is substantially level or its attitude known at the time. My invention is particularly adapted for starting up the gyroscope before take off, that is, when the plane is level (or its attitude known) on the ground. My invention is not so limited, however, but may be used to start up the gyroscope while the plane is in the air by bringing the plane to a substantially level attitude at the time the knob 35' is set and switch 33 closed.

When the gyroscope is properly leveled, in so far as displacement about the roll axis is concerned, winding 31 will be positioned parallel with winding 21, and winding 25 will be located at the signal null with respect to stator 23. As previously stated, winding 31 is disconnected and ineffective while the gyroscope windings are energized.

Windings 21 and 31 are shown in the drawings energized by current from leads 17 and 18 prior to starting the gyroscope. It will be noted that a sequence switch arrangement 32, 33 is positioned with pivoted switch member 33 closing the circuit through lead 18 to winding 31, thus energizing the winding, while at the same time the switch members 32 are in open position, cutting off the current from the gyroscope. Under these conditions, with the gyroscope rotor stationary, immediately on energizing of windings 21 and 31, according to the well-known method of selsyn operation, synchronizing currents are set up in the polyphase windings 23 and 24 of such phase and character as to move windings 21 and 31 immediately into register with each other. Winding 31, however, is held in a fixed position by the pilot holding the knob 35' or by providing sufficent friction in shaft 35 so the torque turns rotor 21 as a repeater and also the gyroscope into the position determined by shaft 35. Thereafter, switch 32, 33 is operated and is effective to first open switch member 33 to disconnect winding 31 and thereafter close the circuits of members 32 to connect the gyroscope.

A rotary switch arrangement such as shown in Fig. 2 may be used to advantage in initially setting the gyroscope in true position and then turning on the gyroscope.

The switch comprises a shaft 40 having a knob 41 provided with an index 42 that cooperates with a stationary scale 43 bearing suitable legends for the various positions of the switch.

Shaft 40 is shown as supporting a number of contact discs, three of which are provided with slip rings, 44, 45 and 46, connected by suitable brushes to current supply leads 16, 17 and 18. Windings 21 and 31 have one terminal connected by a common lead 47 to power lead 17, and their opposite terminals respectively to brushes 48 and 49 that cooperate with contact 50 carried by insulating disc 51. The contact is connected by a lead 52 to slip ring 46 and power lead 18.

When the index is in register with the "off" position on the scale, contact 50 is positioned beyond and to the right of brushes 48 and 49, and the coils 21 and 31 are not energized. When the switch is turned to "position" as shown in Fig. 2, both coils are energized and the gyroscope moves immediately to its true position about the roll axis. In this position the windings of the gyroscope are not energized.

A third disc 55 is provided with three contacts 56, 57 and 58, each of which is connected to one of the power leads 16, 17 and 18 through the slip rings. This contact arrangement is used to turn on the gyroscope. The contacts cooperate respectively with brushes 59, 60 and 61, engaging the latter only when the knob is further advanced to "on" position. The brushes are connected to the windings of the gyroscope.

When the knob is turned from the intermediate position of the drawing, and before the gyroscope circuits are closed, brush 49 moves off the offset portion 63 of contact 50, thus opening the energizing circuit for winding 31, while coil 21 is kept energized through the longer part of the contact.

A detent disc 64 and a cooperating spring 65 are provided for holding the switch in the various positions. A pin 66 in disc 64 engages a stop 67 to prevent the switch from being turned beyond the "on" position. It will be understood that the main gyro-pilot switch, represented at 80, is closed after the gyro is preset and has been brought up to speed.

As indicated by block diagram 70, shaft 40 may carry additional contact groups for simultaneously positioning the gyroscope about its pitch axis, and also for setting a slave directional gyroscope, not shown, into true position in the manner described with reference to a magnetic compass and/or with reference to the horizontal.

It will be understood that I am using the term "selsyn" herein as a broad term representing any type of rotary transformer, self-synchronous repeater or signal generating system, and also that I have used the word "course" as a broad term applicable to the heading or attitude of the craft in any or all of the three dimensions, namely, azimuth, pitch and roll.

What is claimed is:

1. A presetting system for an airplane gyroscope having means for reproducing its relative angular motion including a pair of interconnected selsyn devices, one of which has a displaceable member positioned by the gyroscope, a constantly energized winding on the member, a corresponding member for the other selsyn device adapted to be fixed in any desired position, a signal winding on the second-mentioned member adapted to be energized in accordance with relative displacement of the two members, means for initially positioning the gyroscope comprising a second winding on the second-mentioned member, means for temporarily energizing the second winding, the second winding being adapted when energized to bring the first-mentioned member into register therewith, and thereby to preset the gyroscope.

2. A gyroscopic positional control system having means for bringing the gyroscope into approximately true position while the gyroscope rotor is stationary, comprising a pair of selsyn devices one of which has a displaceable member coupled to an axis of the gyroscope, a constantly energized winding on said member, a corresponding member for the other selsyn device adapted to be fixed in any desired position, a signal winding on the second-mentioned member normally energized in accordance with the relative displacement of the two members, a servomotor normally controlled from said signal, means for positioning the gyroscope with respect to a signal null condition of the winding which comprises a second winding on the second-mentioned member, means for briefly energizing said second winding in advance of the gyroscope, whereby the first-mentioned member is brought into register with the second winding, thereby effecting a corresponding positioning of the gyroscope.

3. A gyroscopic positional control system having means for bringing the gyroscope into approximately true position with respect to that of a course setting device while the gyroscope rotor is stationary, comprising a pair of interconnected selsyn devices, a displaceable member of one of the devices coupled to the gyroscope at one of the axes thereof, a constantly energized winding therefor, a corresponding member for the other selsyn device positioned by the course setting device, a signal pick-up winding therein adapted to be energized by the winding of the first-mentioned member when the windings are relatively displaced, means for initially positioning the gyroscope with respect to a signal null condition of the pick-up winding which comprises a second winding on the second-mentioned member, means for briefly energizing the second winding whereby the winding on the first-mentioned member is brought into register with the second winding whereby the gyroscope is correspondingly preset.

4. A gyroscopic control unit for an automatic pilot having means for bringing the gyroscope into approximately true position with respect to that of a course-setting device while the gyroscope rotor is substantially stationary, comprising a pair of interconnected selsyn devices, a displaceable member for one of the devices coupled to the gyroscope about one of the axes thereof, a winding for the member adapted to be energized from an A. C. supply, a corresponding member for the other selsyn device positioned by the course-setting device, a signal winding on the second-mentioned member adapted to be energized by the winding of the first-mentioned member when the members are relatively displaced, means for initially positioning the gyroscope with respect to a signal null condition of the pick-up winding comprising a second winding on the second-mentioned member, means including switch means for briefly energizing the second winding, thus bringing the winding of the first-mentioned member into register with the second winding and effecting thereby a corresponding positioning of the gyroscope, a main switch for starting up the gyro rotor and means associated therewith for deenergizing said second winding.

5. A control system according to claim 4 having a servomotor in which both switch means are operated by a single member from an "off" position in which all windings and servomotor are deenergized, through an intermediate position where the winding of the first-mentioned member and the second winding are connected in parallel to a common source of alternating current, to a third position where the circuit for the second winding is connected to operate said servomotor and the gyroscope driving circuit is connected to the source of potential.

6. A control system according to claim 4 in which both switch means are operated by a single rotary shaft carrying switch members cooperating with stationary contacts so arranged that when turned from an "off" position where all windings are deenergized, through an intermediate area wherein the windings of the first-mentioned member and the second winding are connected in parallel to a common source of alternating current, a third position is reached wherein the energizing circuit for the second winding is open and the gyroscope driving circuit is connected to the source of potential.

7. A presetting device for a long period gyro-vertical including a pair of interconnected selsyn devices, adapted to be energized from an A. C. supply, one of which has a displaceable member positioned by the gyroscope, a corresponding member for the other selsyn device adapted to be set in an horizontal position, a signal generating winding on one of said devices adapted to have induced therein a current varying in magnitude and sign with relative displacement of the two devices, a second winding associated with said other winding and means for temporarily connecting said second winding to said A. C. source when starting up, whereby said first device acts as a repeater motor to erect the gyroscope before the rotor appreciably starts.

8. A presetting system for an airplane gyroscope having means for reproducing its relative angular motion including a pair of interconnected selsyn devices, one of which has a rotatable member connected to the gyroscope about an axis, a corresponding member for the other selsyn device adapted to be fixed in any desired position, a winding on each of said members, one of said windings being normally supplied with A. C. and the other normally having an output variable with the relative position of said two members, a servomotor normally actuated from said output, a second winding on said last mentioned member adapted when supplied with said A. C. to bring the first mentioned member into register therewith and consequently to preset the gyroscope, and a switch for so supplying said last mentioned member and severing the control of said servomotor from said first winding.

RICHARD S. BRANNIN.

REFERENCES CITED

The following references are of record in the file of this patent:

UNITED STATES PATENTS

| Number | Name | Date |
| --- | --- | --- |
| 2,357,319 | Esval et al. | Sept. 5, 1944 |